United States Patent
Cornelius et al.

(10) Patent No.: US 6,363,152 B1
(45) Date of Patent: Mar. 26, 2002

(54) HYBRID ONE TIME PAD ENCRYPTION AND DECRYPTION APPARATUS WITH METHODS FOR ENCRYPTING AND DECRYPTING DATA

(75) Inventors: Steve Cornelius, Gilbert; Lonnie C. Goff, Tempe, both of AZ (US)

(73) Assignee: Koninklijke Philips Electronics N.V. (KPENV), Eindhoven (NL)

(*) Notice: Subject to any disclaimer, the term of this patent is extended or adjusted under 35 U.S.C. 154(b) by 0 days.

(21) Appl. No.: 09/150,120

(22) Filed: Sep. 9, 1998

(51) Int. Cl.[7] .................................... H04K 9/00
(52) U.S. Cl. .................. 380/255; 380/44; 380/260; 380/281; 713/168
(58) Field of Search ................ 380/44, 255, 259, 380/260, 281, 29, 28, 30; 713/168

(56) References Cited

U.S. PATENT DOCUMENTS 4,218,582 A * 8/1980 Hellman et al. ............ 178/22
5,253,294 A * 10/1993 Maurer ....................... 380/21
5,848,159 A * 12/1998 Collins et al. .............. 380/30

OTHER PUBLICATIONS

U.S. application No. 09/150,119, Goff et al., filed Sep. 9, 1998.

* cited by examiner

*Primary Examiner*—Albert DeCady
*Assistant Examiner*—Todd Jack

(57) ABSTRACT

A hybrid one time pad encryption and decryption apparatus with methods for encrypting and decrypting data wherein a one time random number pad provides high security encryption. The random number sequence is encrypted using DES, RSA or other technique and embedded in the message as a function of the random pad itself. This generates an encryption message that is impervious to attempts to directly decode the message text as the message is randomly dispersed throughout a message and the message contains as much quasi-random data as text. The message is also relatively impervious to attempts to decode the cipher, as the cipher is randomly interrupted by the encrypted data.

21 Claims, 2 Drawing Sheets

HYBRID ONE-TIME PAD DECRYPTION DEVICE.

HYBRID ONE TIME PAD ENCRYPTION AND DECRYPTION APPARATUS WITH METHODS FOR ENCRYPTING AND DECRYPTING DATA

RELATED APPLICATIONS

This application is related to co-pending U.S. Patent application entitled "A METHOD AND APPARATUS FOR GENERATING ONE TIME PADS SIMULTANEOUSLY IN SEPARATE ENCRYPTION/DECRYPTION SYSTEMS" made by the same inventors, assigned to the same assignee and filed concurrently with this application. The disclosure of the above referenced application is incorporated by reference into this application.

1. Field of the Invention

This invention relates generally to encryption and decryption of digital messages or file representations, more specifically, to a hybrid scheme for encrypting and decrypting a high security encrypted message or file representation using a one time random number pad where the pad transmission is multiplexed with the encrypted data and the pad determines the multiplexing pattern.

2. Description of the Prior Art

Encryption and decryption devices are desired within the communications industry. As reliance on electronic banking, internet e-mail and other purely electronic communications increase, there is an increasing need for secure communications which cannot be broken, even with high computation power and heavy investments in technology.

This need is presently being filled by such algorithms as DES (Data Encryption Standard) and RSA (Rivest-Shamir-Adleman) encryption techniques. For the purpose of discussion, these will be referred to as "short key" techniques. While these techniques are robust and allow for variable keys, they are still potentially subject to defeat by application of repetitive analysis to decode the cipher which is cycled many times in a typical message.

A technique which is hypothetically undefeatable is the one time pad technique. Unfortunately it is also impractical in its application. The one time pad technique uses a pad which is a perfectly random set of numbers the same size as the message transmitted. This pad is combined with the message data (typically by an exclusive-OR operation) to produce the encrypted data. Since the pad is truly random, there is no relationship of the output data from this operation to the input data that was provided. The impracticality of the one time pad technique stems from several factors: 1) The encrypted data and pad are twice as large as the original message; and 2) The security requirement for the pad is as great as the security requirement of the message; 3) The recipient needs the pad to decode the message; and 4) The pad can only be used once or repetitive analysis could reveal the pad.

In order to use a one time pad in a practical application, a need exists to transmit the pad in a fashion as secure as the message itself. A method is also needed so that the recipient does not have to have foreknowledge of the pad in order to decode the message.

The present invention fills these needs by creating a hybrid encoding scheme which is reliant on another encryption technique such as DES or RSA, but only exposes a DES or RSA key for the initial portion of the transmission of the pad. As such, it overcomes the limitations of both the one time pad technique and the drawbacks of DES and RSA. The one time pad is transmitted after being encrypted by DES, RSA or other algorithm and interleaved with the message, but the encrypted pad itself is used to determine the interleave pattern. Thus an attempt to decipher the message or pad requires a deciphering of the interleave between the message and the pad, which raises the difficulty far beyond the difficulty of deciphering a DES or RSA encoded message.

The short decryption key must be known to the recipient before the message can be decoded. A scheme such as the Diffie-Hellman Key Exchange algorithm could be used in combination with the present invention.

SUMMARY OF THE INVENTION

In accordance with one embodiment of the present invention, it is an object of the present invention to provide a method and apparatus for encrypting and decrypting messages and files.

It is another object of the present invention to provide a method and apparatus for encrypting and decrypting messages and files which uses a one time pad and securely encodes the one time pad along with the message.

It is another object of the present invention to provide a method and apparatus for encrypting and decrypting messages and files which encodes a one time pad by a short key technique and interleaves the one time pad in a random pattern with the actual message data so as to make it undecipherable except by knowing the short key, which is protected by the interleaving pattern.

BRIEF DESCRIPTION OF THE PREFERRED EMBODIMENT

In accordance with one embodiment of the present invention, a hybrid one-time pad encryption device is disclosed. The device uses a random number generator to generate a pad for each message that is to be encrypted which is the same size as the message. In the preferred embodiment this is accomplished by generating a random sequence at the same rate as an input message data stream. The random number sequence comprises the one time pad and is encoded using a secure technique such as DES or RSA. The input message data is combined with the unencoded one time pad by an exclusive OR and the output data stream is made by interleaving the output of this exclusive OR (the encrypted input data) with the encoded one time pad. The selection of interleave is made by the unencoded one time pad.

In accordance with another embodiment of the present invention, a hybrid one time pad decryption device is disclosed. The decryption device can decode the above encoded output data produced by the encryption device. A demultiplexer routes the encrypted data stream to either the time pad decoder or the pad decrypter, which uses the complement of the DES, RSA or other encryption scheme used to encode the one time pad above, to decode the one time pad. The output of this pad decrypter is returned to the control input of the demultiplexer to reverse the interleaving process that was carried out during encryption. The decoded pad is then combined in the pad decoder with the encrypted data stream using another exclusive OR operation to undo the encryption of the message data that was combined with the pad data in the encrypter. The operation of the present invention is not restricted to the use of exclusive OR as the encryption operator for the one time pad encoder and decoder. Any symmetric operation could be used.

In accordance with the above embodiments, the methods for transmitting and receiving encrypted digital messages or storing and retrieving encrypted data are also disclosed. A random sequence of numbers is generated which serves as the one time pad and is combined with the input data to produce an encrypted data stream. The one time pad itself is encrypted by means of the above mentioned DES, RSA or other "short key" encryption means to produce an encrypted pad and then the encrypted pad and the encrypted data stream are interleaved and output as a single data stream, with the interleave selection made by the unencrypted one time pad.

The foregoing and other objects, features, and advantages of the invention will be apparent from the following, more particular, description of the preferred embodiment of the invention, as illustrated in the accompanying drawings.

DETAILED DESCRIPTION OF THE PREFERRED EMBODIMENT

Figure 1:
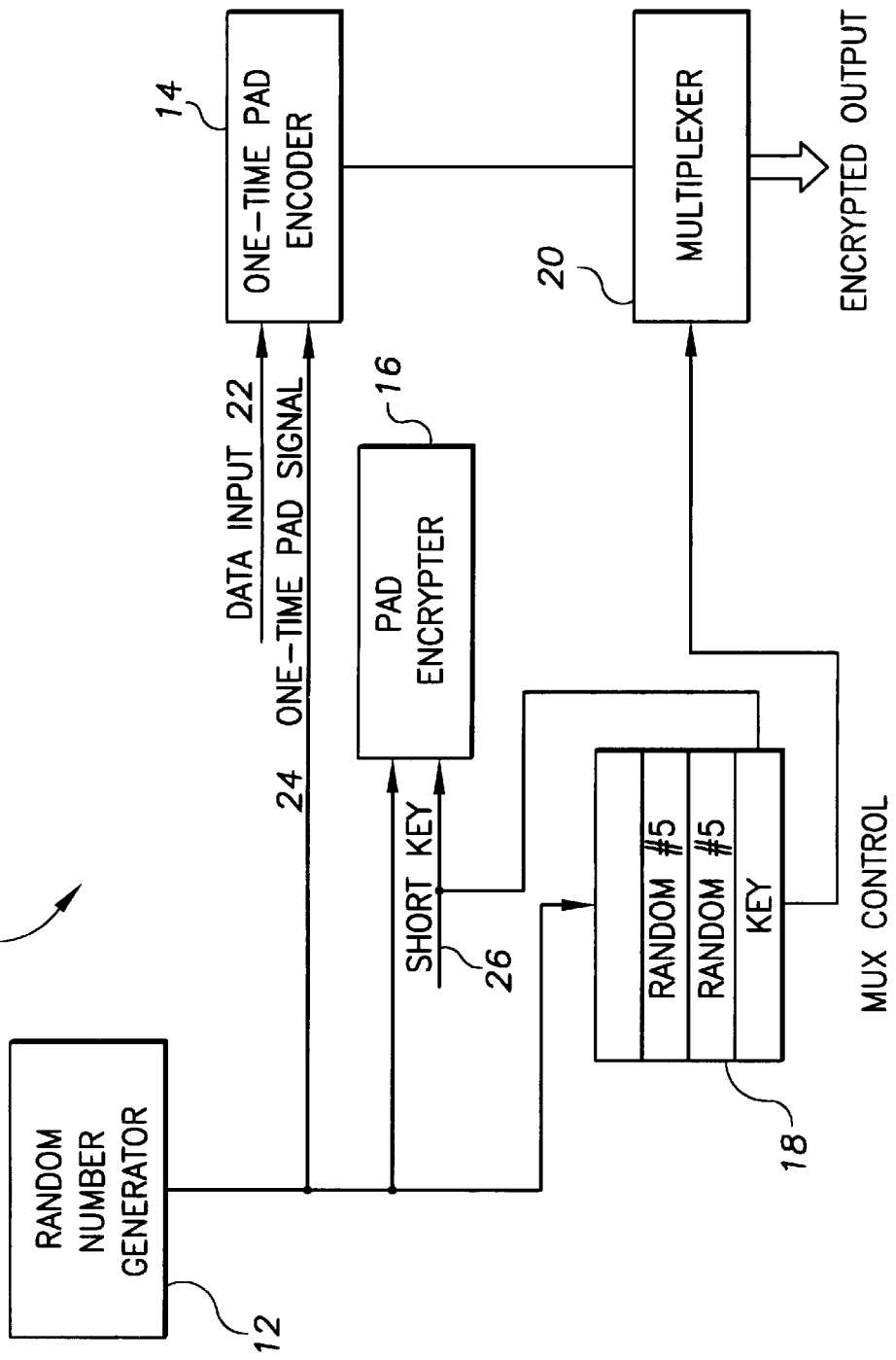
FIG. 1 is a simplified functional block diagram of the hybrid one time pad encrypter.

Referring to FIG. 1, the operation of the hybrid one time pad encryption device 10 will be described. A random number generator 12 generates a random sequence of numbers comprising the one time pad, which is sent across signal line 24. Message data is input to on the data input line 22. The one time pad encoder 14 combines the one time pad signal 24 with the message data 22 and the result is output to a multiplexer 20. In the preferred embodiment this one time pad encoder 14 comprises an exclusive OR gate. However, in other embodiments the encoding could be performed by any symmetrical operator. The one time pad signal 24 is also encrypted by the pad encrypter 16 which in the preferred embodiment is implemented by a DES encrypter. Other embodiments may use techniques such as RSA or any other secure means for encrypting data. The short key 26 is input to the pad encrypter 16 as required by a DES, RSA or other encrypter and is also input to the mux control 18. This short key 26 is the encryption code for the DES, RSA or other encryption algorithm and typically comprises a sequence of bits corresponding to a large number which is the product of prime numbers. The mux control 18 creates the interleave which selects between output data from the one time pad encoder 14 with the output from the pad encrypter 16. The mux control 18 also stores a portion of the random one time pad signal 24. The short key 26 is initially used to select the multiplexer 20 input, since the use of the one time pad signal 24 at the start of message would make it impossible to know the initial interleave pattern to decode the interleave itself. After the initial key 26 has been used to determine the interleave, the mux control 18 then uses the stored one time pad signal 24 that was stored to generate the interleave pattern, thus the interleave quickly becomes random.

Figure 2:
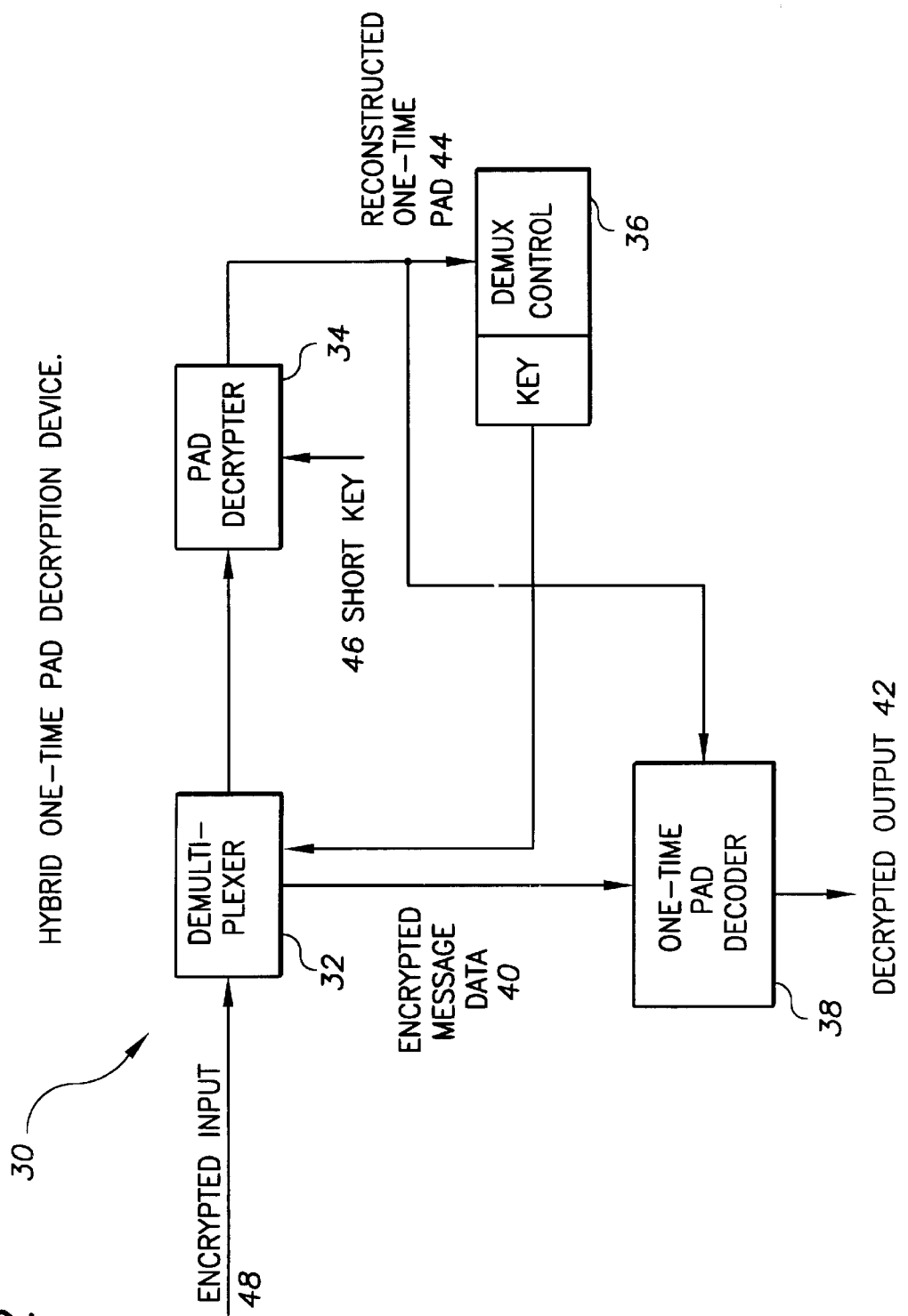
FIG. 2 is a simplified functional block diagram of the hybrid one time pad decrypter.

Referring to FIG. 2, the operation of the hybrid one time pad decryption device 30 will be described. The encrypted input 48 is input to a demultiplexer 32. The demultiplexer 32 is controlled by a demux control 36, which initially uses the short key 46 (which is typically the same key sequence used by the encrypter of the message) to select whether the encrypted input 48 is routed to the pad decrypter 34 or the one time pad decoder 38. This routing reverses the interleave which was created during encryption. The pad decrypter uses the short key 46 and the same algorithm DES, RSA or other that was used during encryption to decrypt the one time pad. The output of the pad decrypter 34 is a reconstruction of the one time pad 44 that was used to encrypt the message. This reconstructed pad 44 is input to the demux control 36 and used to select routing of the encrypted input data 48 once the length of the short key 26 has expired, reversing the random interleave provided by encryption. The one time pad decoder 38 combines the encrypted message data 40 output from the demultiplexer 32 and the reconstructed one time pad 44 to produce the decrypted output 42. The one time pad decoder 38 must comprise the complementary operator to the one time pad encoder 14 (FIG. 1) that was present in the encryption device 10 (FIG. 1) which encrypted the message. In the preferred embodiment, this is another exclusive OR gate. (The exclusive OR operation is self-complementary and symmetric.)

The methods for transmitting and receiving encrypted digital messages or storing and retrieving encrypted data utilize the functional blocks shown in FIG. 1 and FIG. 2, to accomplish the encryption and decryption of a signal or a stored data representation. Referring to FIG. 1, A random sequence of numbers is generated which serves as the one time pad signal 24 and is combined with the input data 22 by a one time pad encoder 14 to produce an encrypted data stream. The one time pad signal 24 is encrypted by means of the above mentioned DES, RSA or other "short key" technique by a pad encrypter 16 to produce an encrypted pad and then the encrypted pad and the encrypted data stream are interleaved and output as a single data stream, with the interleave selection made by the multiplexer 20, controlled by the unencrypted one time pad signal 24.

Referring to FIG. 2, an encrypted data stream 48 is received and the pad 44 is decrypted from it by means of a pad decrypter 34. The pad 44 is used to decode the original data stream by combining it with the input data 48 in the one time pad decoder 38, to produce the decrypted output 42. The demultiplexer 32 reverses the interleaving process accomplished by the multiplexer 20 (FIG. 1) during the encryption process. The demultiplexer 32 is first controlled by the short key 46 and then the reconstructed one time pad 44.

While the invention has been particularly shown and described with reference to preferred embodiments thereof, it will be understood by those skilled in the art that the foregoing and other changes in form, and details may be made therein without departing from the spirit and scope of the invention.

What is claimed is:

1. A hybrid one time pad encryption device comprising, in combination:
   a random number generator for generating a one time pad;
   a one time pad encoder coupled to said random number generator for combining a data input with said one time pad;
   a pad encryptor coupled to said random number generator for combining said one time pad with a key; and
   a multiplexor coupled to said pad encrypter and further coupled to said one time pad encoder for combining an output of said one time pad encoder with an output of said pad encrypter.

2. A hybrid one time pad encryption device in accordance with claim 1 wherein said pad encrypter is a DES encrypter.

3. A hybrid one time pad encryption device in accordance with claim 1 wherein said pad encrypter is an RSA encrypter.

4. A hybrid one time pad encryption device in accordance with claim 1 further comprising a multiplexer control coupled to said multiplexer for using one of said key or said one time pad to control said multiplexer.

5. A hybrid one time pad encryption device in accordance with claim 4 wherein said pad encrypter is a DES encrypter.

6. A hybrid one time pad encryption device in accordance with claim 4 wherein said pad encrypter is an RSA encrypter.

7. A hybrid one time pad decryption device comprising, in combination:
 a demultiplexer for separating an encrypted pad from encrypted data;
 a pad decrypter coupled to said multiplexer for decrypting said encrypted pad to a decrypted pad;
 a one time pad decoder coupled to said pad decrypter and further coupled to said demultiplexer for decoding said encrypted data; and
 a demultiplexer control adapted to use one of a key and said decrypted pad to control said demultiplexer.

8. The hybrid one time pad decryption device comprising:
 a demultiplexer for separating an encrypted pad from encrypted data;
 a pad decrypter coupled to said multiplexer for decrypting said encrypted pad to a decrypted pad;
 a one time pad decoder coupled to said pad decrypter and further coupled to said demultiplexer for decoding said encrypted data; and
 a demultiplexer control adapted to use one of a key and said decrypted pad to control said demultiplexer, wherein
 said pad decrypter is one of a DES decrypter.

9. A hybrid one time pad decryption device in accordance with claim 7 wherein said pad decrypter is an RSA decrypter.

10. A hybrid one time pad encryption device in accordance with claim 7, wherein said pad decrypter is a DES decrypter.

11. A hybrid one time pad encryption device in accordance with claim 7, wherein said pad decrypter is a RSA decrypter.

12. A method for transmitting encrypted data comprising the steps of:
 generating a random number sequence;
 combining said random number sequence with input data to produce an encrypted data stream;
 encrypting said random number sequence with a pad encrypter to produce an encrypted random number sequence;
 using one of a key or said random number sequence to select one of said encrypted random number sequence or said encrypted data stream to produce an output data stream; and
 transmitting said output data stream.

13. A method for transmitting encrypted data in accordance with claim 12 wherein said pad encrypter comprises a DES encrypter.

14. A method for transmitting encrypted data in accordance with claim 12 wherein said pad encrypter comprises an RSA encrypter.

15. A method for storing encrypted data comprising the steps of:
 supplying a data storage;
 generating a random number sequence;
 combining said random number sequence with input data to produce an encrypted data stream;
 encrypting said random number sequence with a pad encrypter to produce an encrypted random number sequence;
 using one of a key or said random number sequence to select one of said encrypted random number sequence or said encrypted data stream to produce an output data stream; and
 writing said output data stream to said data storage.

16. A method for storing encrypted data in accordance with claim 15 wherein said pad encrypter comprises a DES encrypter.

17. A method for storing encrypted data in accordance with claim 15 wherein said pad encrypter comprises an RSA encrypter.

18. A method of claim 12, wherein encrypting includes using an EXOR function.

19. A method of claim 15, wherein encrypting includes using an EXOR function.

20. A method for storing encrypted data comprising the steps of:
 supplying a data storage;
 generating a random number sequence;
 combining said random number sequence with input data to produce an encrypted data stream;
 encrypting said random number sequence with a pad encrypter to produce an encrypted random number sequence
 using one of a key or said random number sequence to select one of said encrypted random number sequence or said encrypted data stream to produce an output data stream; and
 writing said output data stream to said data storage;
 wherein the pad decryption provides demultiplexer controlling as a function of a key.

21. A method for receiving encrypted data comprising the steps of:
 supplying a data receiver;
 receiving an encrypted data stream;
 using a pad decrypter to decrypt a previously encrypted random number sequence form said encrypted data stream to produce q decrypted random number sequence; and
 decoding said encrypted data stream by combining said encrypted data stream with said decrypted random number sequence to produce a decrypted output data stream
 wherein the pad decryption has an EXOR gate and further provides demultiplexer controlling as a function of a key.

* * * * *